March 15, 1932.　　R. R. BOTTOMS　　1,849,475
PRESSURE CONTROL VALVE
Filed April 16, 1929
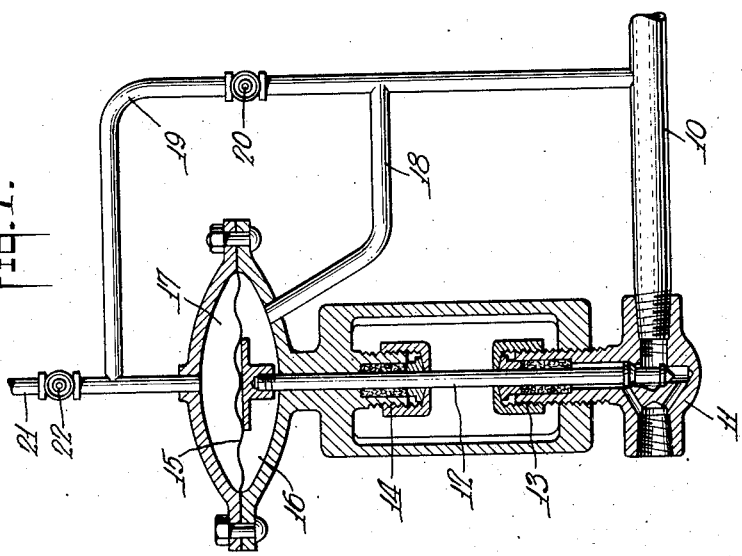
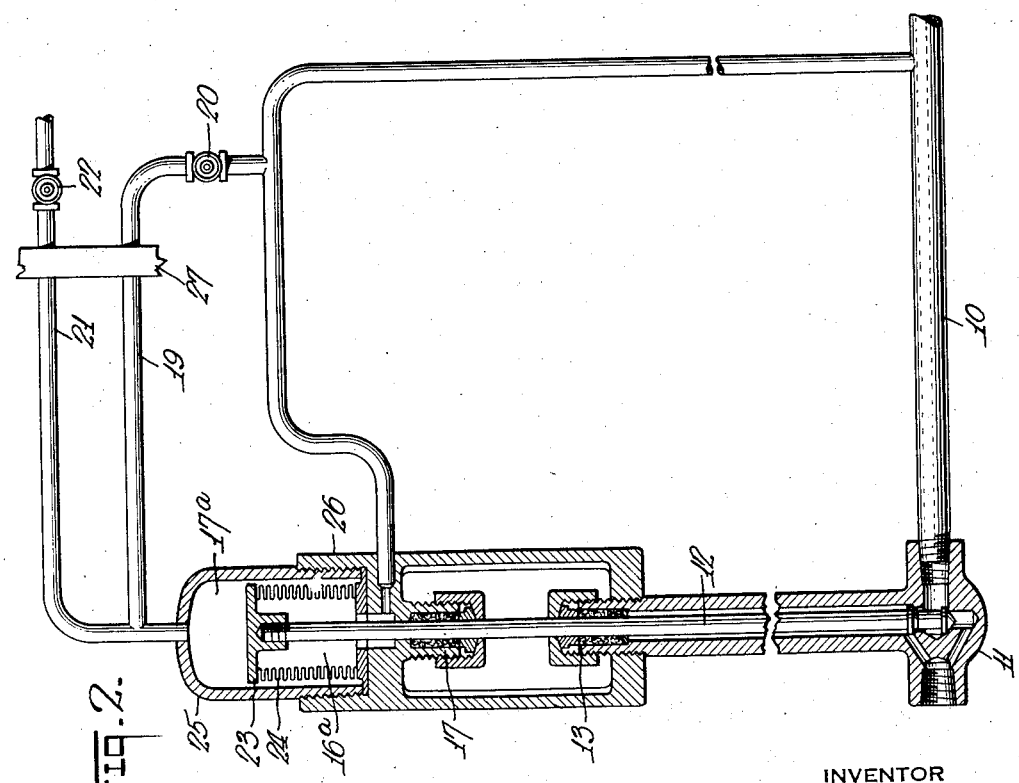
INVENTOR
Robert Roger Bottoms
BY
ATTORNEYS Patented Mar. 15, 1932

1,849,475

UNITED STATES PATENT OFFICE

ROBERT ROGER BOTTOMS, OF LOUISVILLE, KENTUCKY, ASSIGNOR, BY MESNE ASSIGNMENTS, TO THE GIRDLER CORPORATION, OF LOUISVILLE, KENTUCKY, A CORPORATION OF DELAWARE

PRESSURE CONTROL VALVE

Application filed April 16, 1929. Serial No. 355,479.

This invention has for its main object the maintenance of a predetermined high pressure limit on a fluid pressure system, and involves novel means for permitting the escape or release of fluid when the pressure exceeds said limit.

In carrying out my invention I provide a valve operating member, opposite surfaces of which may be subjected to the action of the fluid under the desired high pressure, and one surface of which may be subjected to the action of any high pressure which may develop in the system. Thus, when the pressure in the system is below the predetermined limit, the valve will remain closed, while the high pressure in the system will act against the predetermined pressure to open the valve.

In my improved construction a portion of the fluid under the predetermined pressure may be trapped in the apparatus so as to have a constant effect, and this trapped portion may be bled off or increased from the high pressure side of the valve is case it is desired to lower or raise the pressure limit at which the valve operates.

By utilizing the fluid pressure in this way it is possible to obtain a very accurate control of the pressure, avoid the use of springs, weights or other pressure accessories, and to vary the pressure limit by hand operated valves located at any desired distance from the main automatic valve. With the usual spring or weight for controlling the automatic valve it is necessary to directly adjust the spring or weight to vary the pressure limit.

In the accompanying drawings I have illustrated merely two of many possible embodiments of my invention. In these drawings:

Fig. 1 is a central longitudinal section through a construction embodying the invention, and Fig. 2 is a section of another form with the piping arranged for remote control of the pressure limit.

In the construction illustrated in Fig. 1 the pipe 10 may be connected to any source or system in which it is desired to maintain compressed air or other compressed fluid at or below a predetermined limit. This pipe is provided with any suitable form of outlet valve 11 which may discharge directly into the atmosphere or to an outlet pipe connected to the valve. The valve stem 12 extends through a suitable form of stuffing box 13, whereby the stem may be reciprocated to open or close the valve, and the leakage of fluid along the valve stem is prevented.

The valve stem extends through a second stuffing box 14 and is connected to a pressure actuated valve operating member. This is shown as a diaphragm 15 having its periphery clamped in a diaphragm housing and its center portion connected to the valve stem. The diaphragm thus subdivides the housing into two chambers 16 and 17.

The chamber 16 which is below the diaphragm is connected to the high pressure pipe 10 by means of a pipe 18, whereby the under surface of the diaphragm is at all times subjected to the action of the high pressure fluid, and this high pressure fluid at all times acts in a direction tending to open the valve 11 and permit lowering of the pressure.

In carrying out my invention I connect the chamber 17 at the upper side of the diaphragm with the high pressure pipe 10 by means of a pipe 19 having a shut-off valve 20. The chamber 17 is also provided with an outlet pipe 21 having a valve 22. In the operation of the device the valve 22 is closed and the valve 20 is open. Thus the pressure upon opposite sides of the diaphragm 15 will be the same, and the valve will remain closed. When the pressure in the system reaches the limit, as shown by suitable gauges (not illustrated), the valve 20 is closed so as to trap in the chamber 17 a portion of the fluid at the pressure which it is desired to maintain as the higher pressure limit. The valve 11 will thus remain closed so long as the pressure in the pipe 10 is at or below the pressure in the chamber 17. In case the pressure in the pipe 10 increases, the pressure in the chamber 16 will exceed that in the chamber 17 and the valve will be opened to permit a release of pressure from the pipe 10, until the predetermined limit is reached.

It will be noted that the high pressure limit is maintained without the aid of any springs, weights, or other adjusting members on the valve or diaphragm, and that the action of the valve may be controlled within very narrow limits. In case it is desired to lower the pressure limit, the valve 22 may be opened to let a small portion of the trapped fluid escape and the pressure in the chamber 17 drop to the desired lower limit. The valve 22 may then be closed and the lower pressure limit will be maintained. In case it is desired to raise the pressure limit it is merely necessary to open the valve 20 and leave it open until the pressure in the system builds up to the higher limit, at which time the valve 20 is closed, and the fluid trapped in the chamber 17 and constantly acting on the diaphragm 15 will be at the desired pressure which is to be maintained in the system.

In Fig. 2 I have shown a construction operating on the same principle as that shown in Fig. 1, except that instead of employing a diaphragm as a valve operating member there is employed a piston 23 and sylphon bellows 24 forming the two chambers 16a and 17a. The casing wall 25 forming the upper chamber is shown as screwed into a flange on the lower casing section 26, instead of being bolted thereto, as in Fig. 1.

In Fig. 2 I have indicated a control board 27 which may be the main control board of the apparatus and may be located at any desired distance from the automatic pressure control valve 11. The pipes 19 and 21 are extended from the control valve to this control board, whereby the valves 22 and 20 may be operated as desired, and without going near the automatic valve which may thus be placed in comparatively inaccessible positions on the main apparatus, or in the system in connection with which the valve is employed.

The character of the valve 11 and the system in which my improved device is employed, may be varied through comparatively wide limits. The system may be such that the valve 11 is normally open for a continuous flow, so long as the pressure is above the predetermined limit. Also, the system may be such that the valve 11 is normally open and held open by the gas through pipe 18 acting beneath the diaphragm and the valve 20 is used only when it is desired to close the valve.

It will be evident that at any time when the valve 20 is opened, the pressure on the opposite sides of the controlling member will become equal and the valve may be closed. Thus the valves 20 and 22 may be employed merely as the means for opening and closing the valve 11, at will, and from a distant point. Obviously the pipe 21 may vent to the atmosphere, to the low pressure side of the valve 11, or to any low pressure part of the system in which the device is employed.

Having thus described my invention, what I claim as new and desire to secure by Letters Patent is:

1. A pressure control valve for maintaining a predetermined high pressure limit on a gas to be delivered to a lower pressure including a valve member, and means for closing said valve when the pressure on the supply side is below a predetermined limit, said means including an operating member connected to said valve member, a casing providing separate chambers on opposite sides of said operating member, means for delivering a gas to each of said chambers from the supply side of said valve, and means for confining a predetermined quantity of gas under substantially constant pressure in one of said chambers, irrespective of variations in the gas pressure in the other chamber and at the supply side of said valve.

2. A pressure control valve including a valve member, an operating member connected to said valve member, a casing providing separate compartments on opposite sides of said operating member, open communication between one of said compartments and the high pressure side of said valve, whereby the fluid under higher pressure acts on said operating member and tends to open the valve, and controllable communications between the other compartment and the high pressure side of said valve, whereby the counteracting pressure on said operating member may be maintained in said last mentioned compartment below the pressure in the first mentioned compartment.

3. A pressure control valve for gases including a valve member, an operating member connected to said valve member, a casing providing leak-proof compartments on opposite sides of said operating member, open communication between one of said compartments and the high pressure side of said valve, whereby the gas under higher pressure acts on said operating member and tends to open the valve, valve means for confining a definite quantity of said gas at a predetermined pressure in the other compartment, whereby said valve is opened by the action of the gas at the high pressure side of the valve only when said last mentioned pressure is in excess of that in said last mentioned compartment.

4. In combination, a valve member, a casing having a valve operating member operatively connected to said valve and dividing said casing into two chambers, open communication between one of said chambers and the source of fluid supply to said valve, controllable means for delivering fluid to the other chamber from said source of fluid supply, whereby the fluid pressure on opposite sides of said operating member may be equalized, and controllable means for establishing and maintaining in said last mentioned chamber any desired pressure below that of said source of fluid supply, whereby said valve is opened when the pressure of said source of fluid supply materially exceeds that of said maintained pressure.

Signed at Louisville, in the county of Jefferson and State of Kentucky, this 13th day of April, A. D. 1929.

ROBERT ROGER BOTTOMS.